US006999918B2

(12) United States Patent
Ma et al.

(10) Patent No.: US 6,999,918 B2
(45) Date of Patent: Feb. 14, 2006

(54) METHOD AND APPARATUS TO FACILITATE CORRELATING SYMBOLS TO SOUNDS

(75) Inventors: Changxue Ma, Barrington, IL (US); Mark Randolph, Kildeer, IL (US)

(73) Assignee: Motorola, Inc., Schaumburg, IL (US)

( * ) Notice: Subject to any disclaimer, the term of this patent is extended or adjusted under 35 U.S.C. 154(b) by 376 days.

(21) Appl. No.: 10/251,354

(22) Filed: Sep. 20, 2002

(65) Prior Publication Data

US 2004/0059574 A1 Mar. 25, 2004

(51) Int. Cl.
*G10L 13/00* (2006.01)
*G06F 17/21* (2006.01)

(52) U.S. Cl. .......................................... 704/10; 704/260
(58) Field of Classification Search ................... 704/10, 704/258, 260, 266, 270, 269
See application file for complete search history.

(56) References Cited

U.S. PATENT DOCUMENTS

| | | | | |
|---|---|---|---|---|
| 5,682,501 A | | 10/1997 | Sharman | |
| 5,835,888 A | * | 11/1998 | Kanevsky et al. | 704/9 |
| 6,016,471 A | | 1/2000 | Kuhn et al. | |
| 6,112,173 A | * | 8/2000 | Hirayama | 704/242 |
| 6,163,768 A | * | 12/2000 | Sherwood et al. | 704/235 |
| 6,347,295 B1 | | 2/2002 | Vitale et al. | |
| 6,363,342 B1 | | 3/2002 | Shaw et al. | |
| 6,470,347 B1 | * | 10/2002 | Gillam | 704/10 |
| 6,671,856 B1 | * | 12/2003 | Gillam | 704/10 |

* cited by examiner

*Primary Examiner*—Martin Lerner
(74) *Attorney, Agent, or Firm*—Fitch, Even, Tabin & Flannery

(57) ABSTRACT

A dictionary is comprised of a dendroid hierarchy of branches and nodes, wherein each node represents no more than one symbol (which symbol is to be converted to a corresponding sound) and wherein each such symbol as is represented at a given node has only one corresponding sound associated with that symbol at that node. In addition, many of the branches include a plurality of nodes representing a string of the symbols in a particular sequence. The dictionary is used to translate an input comprising a given integral sequence of the symbols into a corresponding integral sequence of sounds. This permits both method and apparatus to convert, for example, text to representative phonemes. Such phonemes can be used, amongst other purposes, to support synthesized speech production.

25 Claims, 2 Drawing Sheets

METHOD AND APPARATUS TO FACILITATE CORRELATING SYMBOLS TO SOUNDS

TECHNICAL FIELD

This invention relates generally to the correlation of symbols to sounds and more particularly to the conversion of text to phonemes.

BACKGROUND

Prior art approaches exist to convert text into corresponding sounds. Such techniques permit, for example, the conversion of text into audible synthesized speech. Many such approaches use phonemes that are units of a phonetic system of the relevant spoken language and that are usually perceived to be single distinct sounds in the spoken language. Using phonemes in this way in fact constitutes a relatively effective and accurate mechanism to achieve telling results. Unfortunately, however, prior art techniques do not always reliably select the correct phonemes.

Part of the problem stems from the fact that, in many spoken languages that have a corresponding symbolic alphabet, one or more of the symbols have more than one proper pronunciation. As a result, some symbols have more than one potentially appropriate phoneme (or set of phonemes) associated therewith. Various prior art approaches have been suggested to attempt mitigating the effect of this circumstance. Unfortunately, these solutions generally tend to be computationally intensive and/or require a considerable amount of memory. This tends to render such solutions inappropriate for use in resource-limited platforms (such as, for example, cellular telephones) where computational capacity itself and/or electric power can be considerably constrained.

For example, one prior art approach (known in at least some circles as "N-gram analysis") uses a combination of probability analysis and grammatical context to weight a corresponding conclusion regarding pronunciation of a given word. To illustrate, the word "read" can be enunciated in English in either of two ways depending upon the grammatical context. By storing the rules regarding such context and by examining other words around the word "read" in view of those rules, one can potentially deduce a correct pronunciation for a given instance of the word. Again, however, such an approach often requires at least a significant quantity of memory as well as a fairly elaborate development and manipulation of contextual rules.

Many prior art approaches also fall short in view of another common occurrence; the need to pronounce a proper name or other word that is not in the dictionary of the process. To ameliorate, at least to some extent, this problem, the prior art suggests permitting a user to train the process by introducing the word along with its pronunciation. This approach, however, can be time consuming, tedious, confusing to the user, and again highly consumptive of memory and computational capacity.

BRIEF DESCRIPTION OF THE DRAWINGS

The above needs are at least partially met through provision of the method and apparatus to facilitate correlating symbols to sounds described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention, Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a symbol-to-sound translator (such as a text to phoneme translator) utilizes a dictionary comprising a dendroid hierarchy of branches and nodes, wherein each node represents no more than one of the symbols and wherein each such symbol as is represented at a node has only one corresponding sound associated with that symbol at that node, and where each branch includes a plurality of nodes representing a string of the symbols in a particular sequence. In a preferred embodiment, at least some of the symbols comprise alphanumeric textual characters such as letters. If desired, a combination of symbols can be used to represent a single sound (such as the combination of letters "ch" that can be used in the English language to represent a single phoneme sound). Also in a preferred embodiment, at least some of the sounds can be comprised of phonemes. If desired, the strings of symbols as represented by the branches can represent entire words in the corresponding spoken language. In a preferred embodiment, however, such strings can also accommodate incomplete words such as, but not limited to, grammatical prefixes, suffixes, stems, and/or morphemes.

In a preferred embodiment, at least some of the nodes have a probability indicator correlated therewith. This indicator reflects how frequently the corresponding sound associated with the symbol at that node has been previously selected for use when translating an input that included the symbol at that node. If desired, such probability indicators can be recalculated and revised dynamically on a substantially continuous basis. In a alternative embodiment, a probability indicator located in one portion of a branch can be used to temporarily impact the probability indicator as associated with a node located elsewhere in that same branch. For example, the probability of use indicator for a given node can be modified as a function of at least one probability of use indicator for a lower hierarchical node on a shared branch. In a preferred embodiment, this modification comprises temporarily replacing the probability indicator at the given node with the probability indicator for the node located lower in the dictionary dendroid hierarchy.

Figure 1:
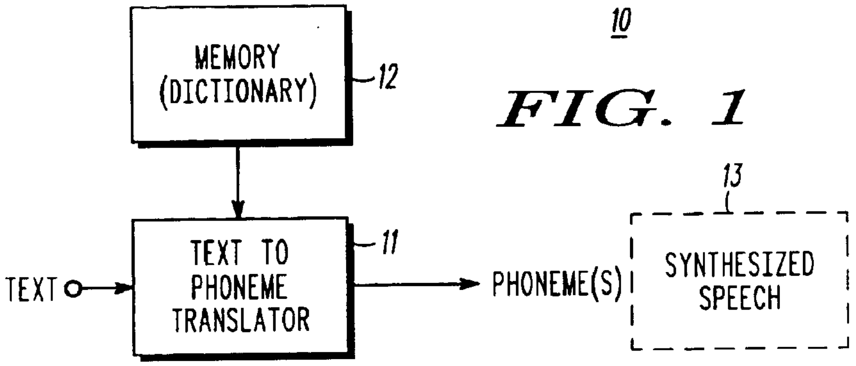
FIG. 1 comprises a block diagram view of a text to speech platform as configured in accordance with an embodiment of the invention.

Referring now to the drawings, and in particular FIG. 1, a symbol-to-sound platform 10 will typically include a text to phoneme translator 11 having a memory 12 either operably coupled thereto or internally contained therein. The memory 12, in addition to such other content (such as programming instructions and/or other data as may be used by the text to phoneme translator 11) as may be stored therein, includes a dictionary. In this embodiment, the dictionary comprises a dendroid hierarchy of branches and nodes, wherein each node represents no more than one symbol and wherein each such symbol as is represented at a node has only one corresponding sound associated with that symbol at that node. In general, each branch includes a plurality of nodes. The plurality of nodes represents a string (or plurality of strings) of the symbols in a particular sequence (in a preferred embodiment, these strings include a variety of complete words as well as grammatical prefixes, suffixes, stems, and morphemes). Such strings can correspond to more than one written/spoken language if desired, but in a preferred embodiment are largely directed to only a single language per dictionary (and, of course, multiple dictionaries as correspond to different language can be simultaneously stored in the memory 12). At least some of the symbols will appear repeatedly at different nodes with different corresponding sounds. Additional description regarding such a dictionary appears below. In general, the symbol-to-sound platform 10 comprises a programmable platform such as a microprocessor, microcontroller, programmable gate array, digital signal processor, or the like (though if desired, a less flexible platform architecture could be used where appropriate to a given application).

The text to phoneme translator 11 has one or more inputs to receive symbols. In this embodiment, at least some of the symbols comprise alphanumeric textual characters and in particular comprise combined alphanumeric textual characters such as a series of words comprising a plurality of sentences. Such text can be sourced to support a variety of different purposes. For example, the text may correspond to a word processing document, a webpage, a calculation or enquiry result, or any other text source that the user wishes, for whatever reason, to hear audibly enunciated.

In this embodiment, the text to phoneme translator 11 produces sounds comprised of phonemes (where phonemes are understood to each comprise units of a phonetic system of spoken language that are perceived to be single distinct sounds in the spoken language). Typically, a given integral sequence of symbols introduced at the input will yield a corresponding integral sequence of sounds at the output. For example, a first integral sequence of letters that comprise a single word will yield a corresponding integral sequence of phonemes that represent an audible utterance of that particular word. If desired, such phoneme information can be used to facilitate, for example, the synthesization of speech 13. Phoneme information can be used for other purposes as well, however, and these teachings are applicable for use in such alternative applications as well.

Such a symbols-to-sounds platform 10 can be a standalone platform or can be comprised as a part of some other device or mechanism, including but not limited to computers, personal digital assistants, telephones (including wireless and cordless telephones), and various consumer, retail, commercial, and industrial object interfaces.

Figure 2:
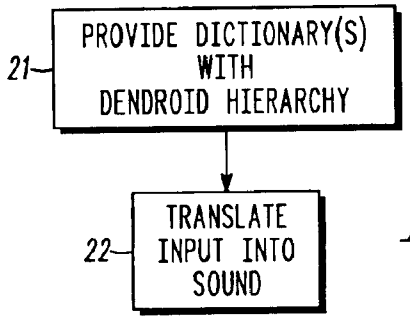
FIG. 2 comprises a general flow diagram as configured in accordance with an embodiment of the invention.

Referring now to FIG. 2, in the various embodiments presented herein, in general a dictionary (or dictionaries) having a dendroid hierarchy is provided 21 and used to translate 22 symbol input (such as text input) into corresponding sounds (such as phonemes). As described above, a memory 12 can serve to provide such a dictionary and a text to phoneme translator 11 can serve to so translate symbols into corresponding sounds.

Figure 3:
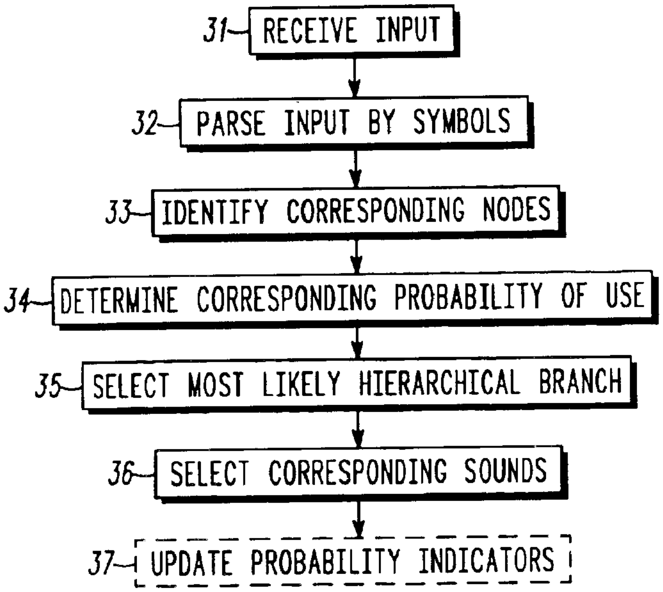
FIG. 3 comprises a detailed flow diagram as configured in accordance with an embodiment of the invention.

Referring now to FIG. 3, the symbol to sound process will be described in more detail. As already noted, the platform 10 receives input comprising one or more symbols (such as alphanumeric text). For example, the input can comprise the alphanumeric expression "gone," which includes four letters combined to form a single word in the English language. Each of these letters has a corresponding sound (which "sound" can include silence, of course) and, at least in the English language, will typically have a number of corresponding sounds. These embodiments serve to facilitate the correct choosing of such sounds to achieve a proper pronunciation of the word itself as represented by the appropriate phonemes. Such integral symbol groups are parsed 32 to separate the individual characters. For example, the word "gone" would be parsed into the individual letters "g," "o," "n," and "e." The platform then identifies 33 appropriate corresponding nodes in the dictionary.

Figure 4:
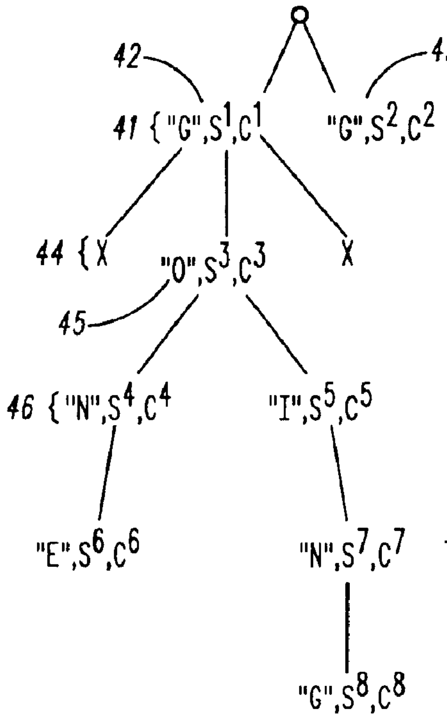
FIG. 4 comprises a schematic view of an illustrative portion of a hierarchically organized dictionary as configured in accordance with an embodiment of the invention.

Referring momentarily to FIG. 4, this concept of nodes and the overall dendroid hierarchy of the dictionary will be described in more detail. Each node in the dictionary hierarchy includes a single symbol and a single corresponding sound. There can be multiple nodes, however, that share a common symbol. Such nodes will also typically have differing sounds. For example, there can be a plurality of nodes 41 that each include the letter "g" 42 and 43. The first node 42, however, can have a corresponding sound $S^1$ for the symbol "g" such as the sound of"g" in the English word "give," while a second node 43 has a corresponding sound $S^2$ such as the sound of"g" in the English word "gin."

Each such node may then couple via a branch to one or more other nodes. For example, the first "g" node 42 noted above can couple to a number of other nodes 44 including a node 45 that includes the letter "o" and the corresponding sound $S^3$ of"o" as occurs in the English word "song" (the other nodes 44 can include the same letter "o" and/or other letters entirely—for example, one node might include the letter "i" as part of the string "give"). In a similar fashion, this secondary node with the letter "o" 45 can itself branch to another hierarchical level 46 to represent yet additional symbols such as a node for the letter "n" (with corresponding sound $S^4$ for the letter "n" pronounced as in the English word "con") (and as part of a hierarchical branch that includes the string "gone") and a node for the letter "i" (with corresponding sound $S^5$ for the letter "i" pronounced as in the English word "stopping") (and as part of a hierarchical branch that includes the string "going").

So configured, it should be evident that many words and word parts are readily represented as strings of such nodes and that duplicate letter/sound entries are avoided to some extent by the dendroid hierarchical structure described. As a result, a dictionary composed in such a way can represent a relatively large quantity of textual input (and corresponding phoneme content) in a relatively small amount of memory.

In addition, a probability indicator (or indicators) can be also provided at some (or all) nodes to provide an indication of how frequently the corresponding sound associated with the symbol at that node has been selected for use when translating an input that included the symbol at that node. In particular, such an indicator can represent how many times the corresponding sound for the symbol at a given node has been selected as compared to identical symbols having different corresponding sounds at other nodes at the same hierarchical level as the given node. Such probabilities can be calculated apriori and included as a static component of the dictionary. In a preferred embodiment, however, the probability indicators are dynamic and change in value with experience and use of the dictionary. The probabilities can all begin at an equal level of probability (or can be initially offset as desired) and can then be recalculated as desired to update the probability indicators.

For example, and with continued reference to FIG. 4, the first "g" node 42 described above can have a probability indicator $C^1$ associated therewith (such as "0.6") and the second "g" node 43 can have a probability indicator $C^2$ associated therewith (such as "0.4"). Such values would indicate that the sound $S^1$ for the first "g" node 42 has been used more often than the sound $S^2$ for the second "g" node 43.

Figure 5:
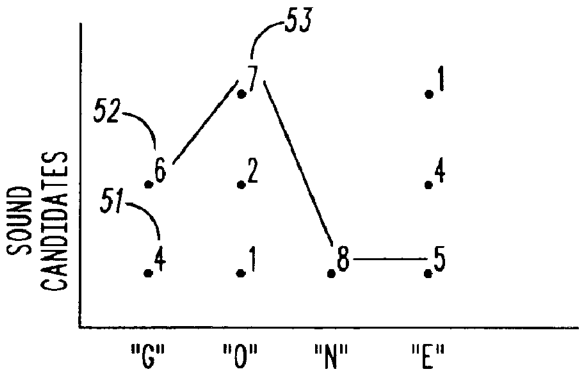
FIG. 5 comprises a lattice view that illustrates selection of a given branch within the hierarchically organized dictionary as configured in accordance with an embodiment of the invention.

So configured, and referring now back again to FIG. 3, the platform 10 can next determine 34 the probability of use as corresponds to each previously identified node by accessing the probability indicator for each such node. With such information, the platform 10 can then select 35 a most likely hierarchical branch for the text input now being processed. There are a variety of ways that such a selection can be effected. In a preferred embodiment, and referring momentarily to FIG. 5, the candidate nodes and their corresponding probability indicators can be conceptually represented as a lattice. A "most likely" path through the lattice will result in identifying a particular hierarchical branch for the given text. To illustrate this concept, a lattice presents the probability indicators for each candidate node for the individual letters of the text "gone." For purposes of this example, a first candidate sound at a first node 51 for the letter "g" has a probability indicator of "0.4." This probability indicator is less than the probability indicator of "0.6" as exists for a second candidate sound at a second node 52 for the letter "g." As a result, the second candidate sound as associated with the probability indicator of "0.6" is selected. In a similar fashion, the highest probability indicator for each group of candidate nodes for each letter is in turn selected until a complete branch has been identified for the text.

Returning again to FIG. 3, the platform 10 then selects 36 the corresponding sounds for each node of the resulting hierarchical branch. These corresponding sounds are, in this example, the phonemes that constitute the output of the process.

In a process where the probability indicators are dynamically altered through use, the probability indicators can now be updated 37 to reflect this most recent use of the dictionary to select a particular sequence of phonemes to represent a given text input.

Figure 6:
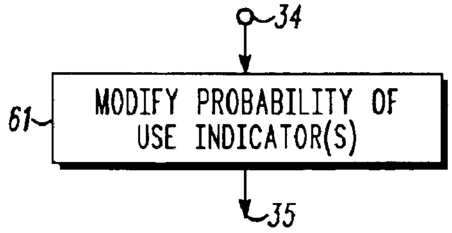
FIG. 6 comprises a detailed portion of a flow diagram as configured in accordance with another embodiment of the invention.

In a preferred embodiment, and referring now to FIG. 6, subsequent to determining 34 the probabilities of use of the various candidate nodes and prior to selecting 35 the most likely hierarchical branch, the platform 10 can modify 61 one or more of the probability of use indicators. In particular, a higher probability node that is lower on the hierarchical scale can be used to more significantly weight a lower probability node that is higher on the hierarchical scale. To illustrate, the probability indicator for a given node that is higher than the probability indicator for another node that shares the same hierarchical branch as the given node and that is higher on that branch than the given node can have its probability indicator substituted for the probability indicator of the hierarchically lower node. (In another embodiment, if desired, the probability indicator of the hierarchically higher node can be modified in other ways, such as by taking an average of the two probability indicators.)

Viewed in a more rigorous light, consider that the probability $P(\beta_1, \beta_2, K\ \beta_n|\alpha_1, \alpha_2, K\ \alpha_m)$ indicates the likelihood for a given phone sequence $\beta_1, \beta_2, K\ \beta_n$ as a whole being generated from a given text string $\alpha_1, \alpha_2, K\ \alpha_m$. Pursuant to the above process, pronunciations for all possible sub-strings of the input are retrieved from the dendroid hierarchical dictionary and this probability is calculated as the sum of the probabilities for all possible phonetic realizations for the input sub-strings. For a given input word $\omega=\alpha_1, \alpha_2, \ldots \alpha_m$), let $\omega_i^k$ (j)=$\alpha_i \ldots \alpha_{j-l}\alpha_j\ \alpha_{j+l} \ldots \alpha_k$ denote the sub-string of word $\omega$ beginning in position i with letter $\alpha_i$, ending in position k with letter $\alpha_k$, and having a focus letter $\alpha_j$. In other words, $\alpha_i \ldots \alpha_{j-l}$ and $\alpha_{j+l} \ldots \alpha_k$ denote $\alpha_j$'s left and right context respectively. Paths $\tau_{ik}^{(j)}$ in the hierarchical context tree are a set of letter-to-sound translations of $\omega_i^k$ (j) found by searching the dictionary tree, where k>=j. Basically, as the search extends letter by letter from left to right, the context tree grows. If no letter match is found the context tree stops growing.

For each input word string, the platform 10 searches the dictionary repeatedly until all possible pronunciations of a given input sub-string are found. In other words, the search starts at each node of the dictionary tree until each of the nodes has been used as a starting node. In this way, the occurrence of each path $\tau_{ik}^{(j)}$ will be accumulated.

In many cases the dictionary will not include the whole text string. Nevertheless, in most cases, at least some partial segments of the text string will typically be found in the dictionary. A variable context length can therefore be used in this method as the sum of the probabilities for all the relevant input letter sequences.

In this way, the occurrence of each path $\tau_{ik}^{(j)}$ will be accumulated. To illustrate, let $N(\alpha_i, \alpha_{i+l}, \ldots \alpha_k)$ represent the counts for string segment $\alpha_1, \alpha_{i+l}, \ldots \alpha_k$ and let $M(\beta_i^l, \beta^l_{i+l}, \ldots \beta_k^l)$ represent the counts for its Ith transcription. The probability for transcription $\beta_i^l, \beta_{i+l}^l, \ldots \beta_k^l$ can therefore be estimated as:

$$P(\beta_i^l, \beta_{i+1}^l, \ \ldots\ \beta_k^l|\alpha_i, \alpha_{i+1}, \ \ldots\ \alpha_k) = \frac{M(\beta_k^l, \beta_{i+1}^l, \ \ldots\ \beta_k^l)}{N(\alpha_i, \alpha_{i+1}, \ \ldots\ \alpha_k)}$$

These probabilities comprise the probability indicators that are recorded at the leaf nodes of the context trees as described earlier. It should be noted that for each node in the context tree, there can be more than one probability associated with it, because the node can have more than one child node. With the first Viterbi pass, the probabilities on the leaf nodes propagate upwards and retain the maximum probability value for each node.

In effect, for each new word, the process chooses a letter as the focus and uses maximum possible context around the focused letter. The process then uses this word segment as a key to traverse the dendroid hierarchy of the dictionary. During this traversal, sub-trees are generated. These sub-trees contain all possible context segments ranging from a minimum length to maximum length. To start the tree traversal at any node of the dictionary tree, the counts $M(\beta_i^l, \beta^l_{i+l}, \ldots \beta_k^l)$ and $N(\beta_i, \beta_{i+l} \ldots \beta_k)$ of how an orthographic segment is transformed into a pronunciation are accumulated.

After building the sub-tree, the probabilities of symbol to phoneme mapping at each level of the sub-tree are estimated. The probabilities at the leaf node of the sub-tree are then propagated upwardly with respect to the hierarchical structure of the tree. In a preferred embodiment, when the probability of mapping on a child node is larger than that of the parent, then the probability indicator for the parent node is replaced with that of the child node.

All the paths $\tau_{ik}^{(j)}$ in the sub-trees are translated into a lattice representation for generating N-best baseform transcriptions with a Viterbi search. To consider the edge effects where a given cut point could lose important context information, a window function that centers on the focused grapheme letters can be used to weigh down the contribution of the probabilities near both ends of the text string. Since the probabilities are estimated for each grapheme in the text with all possible context lengths, the probability of each grapheme is a mixture of all windowed segment probabilities. Penalties can also be added to adjust the weight for segments of different length. In general, a shorter context will be accorded a higher penalty because long contexts offer more disambiguation than shorter ones.

It should be observed that the focused letters whose phonemes are searched for can consist of a consonant string or a vowel string. This means that the process can obtain the corresponding phonemes without breaking the consonant or vowel strings. This can aid in avoiding a lot of unnecessary and misleading conversions. Also, each occurrence of the context segment is counted. Therefore the longest segment and the most frequent one play a dominant role in determining the letter-to-sound conversion. Further, the dictionary can be built up recursively so that it covers the data where basic rules can be learned. These basic rules should predict a significant part of the big dictionary accurately So configured, the resultant dictionary and corresponding process are relatively well suited to facilitate various symbol-to-sound activities in a way that potentially requires less memory than prior approaches. In addition, the described platform and processes are well suited in particular to support the pronunciation of words that are not actually included in the dictionary for whatever reason, thereby meeting a significant existing need.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method of correlating symbols with sounds, wherein at least some of the symbols can correspond to a plurality of sounds and at least some of the sounds can correspond to a plurality of symbols, comprising:

providing a dictionary comprising a dendroid hierarchy of branches and nodes, wherein each node represents no more than one of the symbols and wherein each such symbol as is represented at a node has only one corresponding sound associated with that symbol at that node, and each branch includes a plurality of nodes representing a string of the symbols in a particular sequence;

automatically using the dictionary to translate an input comprising a given integral sequence of the symbols into a corresponding integral sequence of sounds.

2. The method of claim 1 wherein at least some of the symbols comprise alphanumeric textual characters.

3. The method of claim 2 wherein at least some of the symbols comprise combined alphanumeric textual characters.

4. The method of claim 1 wherein at least some of the sounds comprise phonemes.

5. The method of claim 4 wherein the phonemes each comprise units of a phonetic system of a spoken language, which units are perceived to be single distinct sounds in the spoken language.

6. The method of claim 1 wherein at least some of the strings of the symbols constitute at least one of a grammatical prefix, suffix, stem, and morpheme.

7. The method of claim 1 wherein providing a dictionary comprising a dendroid hierarchy of branches and nodes further includes correlating a probability indicator with each such symbol as is represented at a node to provide an indication of how frequently the corresponding sound associated with the symbol at that node has been selected for use when translating an input that included the symbol at that node.

8. The method of claim 7 wherein automatically using the dictionary to translate an input comprising a given integral sequence of the symbols into a corresponding integral sequence of sounds includes using at least one of the probability indicators to translate the input into the corresponding integral sequence of sounds.

9. The method of claim 1 wherein automatically using the dictionary to translate an input comprising a given integral sequence of the symbols into a corresponding integral sequence of sounds includes:

receiving a first plurality of symbols that, together and in the given integral sequence, represents an expression in a spoken language;

accessing the dendroid hierarchy of branches and nodes to identify nodes having corresponding symbols that correlate to the individual symbols that comprise the first plurality of symbols to form a plurality of candidate corresponding sounds.

10. The method of claim 9 wherein providing a dictionary comprising a dendroid hierarchy of branches and nodes further includes correlating a probability of use indicator with each such symbol as is represented at a node to provide an indication of how frequently the corresponding sound associated with the symbol at that node has been selected for use when translating an input that included the symbol at that node.

11. The method of claim 10 wherein automatically using the dictionary to translate an input comprising a given integral sequence of the symbols into a corresponding integral sequence of sounds further includes using the probability of usage indicator as is associated with at least some of the symbols that correspond to the nodes to select a particular corresponding sound from amongst the plurality of candidate corresponding sounds.

12. The method of claim 10 wherein correlating the probability of use indicator with each such symbol as is represented at a node includes calculating the probability of use indicator for each such symbol as a function of how many times the corresponding sound for the symbol at a given node has been selected as compared to identical symbols having different corresponding sounds at other nodes at the same hierarchical level as the given node.

13. The method of claim 12 wherein correlating the probability of use indicator with each such symbol as is represented at a node further includes modifying the probability of use indicator for a given node as a function of at least one probability of use indicator for a node located elsewhere on a branch that includes the given node.

14. The method of claim 13 wherein modifying the probability of use indicator for a given node as a function of at least one probability of use indicator for a node located elsewhere on a branch that includes the given node includes modifying the probability of use indicator for a given node as a function of at least one probability of use indicator for a lower hierarchical node located on a branch that includes the given node.

15. The method of claim 14 wherein modifying the probability of use indicator for a given node as a function of at least one probability of use indicator for a lower hierarchical node located on a branch that includes the given node includes at least temporarily replacing the probability of use indicator for a given node with the probability of use indicator for the lower hierarchical node.

16. The method of claim 1 wherein automatically using the dictionary to translate an input comprising a given integral sequence of the symbols into a corresponding integral sequence of sounds includes converting text into synthesized audible speech.

17. The method of claim 1 wherein automatically using the dictionary to translate an input comprising a given integral sequence of the symbols into a corresponding integral sequence of sounds includes converting text into corresponding phonemes.

18. An apparatus comprising:

a memory having a dictionary stored therein, the dictionary comprising a dendroid hierarchy of branches and nodes, wherein each node represents no more than one symbol and wherein each such symbol as is represented at a node has only one corresponding sound associated with that symbol at that node, and each branch includes a plurality of nodes representing a string of the symbols in a particular sequence, wherein at least some of the symbols appear repeatedly at different nodes with different corresponding sounds;

a text to phoneme translator operably coupled to the memory.

19. The apparatus of claim 18 wherein at least some of the symbols comprise alphanumeric characters.

20. The apparatus of claim 19 wherein the corresponding sounds comprise individual phonemes.

21. The apparatus of claim 19 wherein the text to phoneme translator includes translation means for converting text into phonemes as a function, at least in part, of the contents of the dictionary.

22. The apparatus of claim 21 wherein the dictionary further includes a probability of use indicator for at least some of the nodes as corresponds to the represented symbol and the corresponding sound associated therewith.

23. The apparatus of claim 22 wherein the translation means further converts text into phonemes as a function, at least in part, of the probability of use indicators.

24. The apparatus of claim 23 wherein the translation means further at least temporarily alters at least one probability of use indicator to facilitate selection of a given corresponding sound to use when translating text into the phonemes.

25. The apparatus of claim 24 wherein the translation means alters the at least one probability of use indicator as a function, at least in part, of other probability of use indicators as are retained in the dictionary.

* * * * *